No. 868,193. PATENTED OCT. 15, 1907.
A. LEINVEBER.
PROCESS OF PREPARING FROM CELLULOSE, PAPER PULP, WOOD PULP,
OR SIMILAR MATERIAL, STRIPS CAPABLE OF BEING SPUN.
APPLICATION FILED MAY 2, 1902.

5 SHEETS—SHEET 1.

Witnesses:

Inventor:
Alfred Leinveber.
by
Attorney.

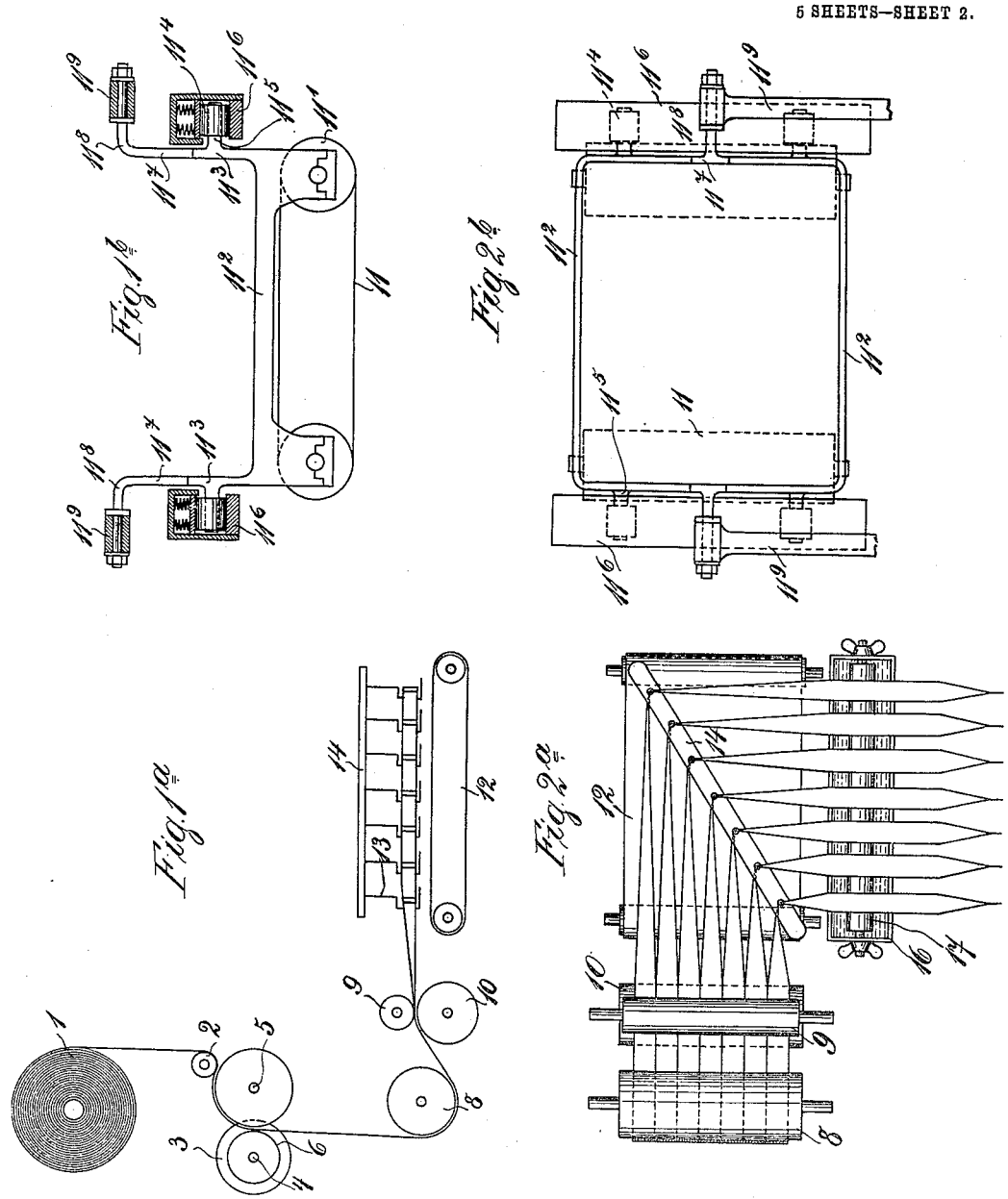

No. 868,193. PATENTED OCT. 15, 1907.
A. LEINVEBER.
PROCESS OF PREPARING FROM CELLULOSE, PAPER PULP, WOOD PULP,
OR SIMILAR MATERIAL, STRIPS CAPABLE OF BEING SPUN.
APPLICATION FILED MAY 2, 1902.

5 SHEETS—SHEET 3.

Witnesses:
Carli Ruff.
Arthur Scholz.

Inventor:
Alfred Leinveber.
by
Attorney.

No. 868,193. PATENTED OCT. 15, 1907.
A. LEINVEBER.
PROCESS OF PREPARING FROM CELLULOSE, PAPER PULP, WOOD PULP,
OR SIMILAR MATERIAL, STRIPS CAPABLE OF BEING SPUN.
APPLICATION FILED MAY 2, 1902.
5 SHEETS—SHEET 4.
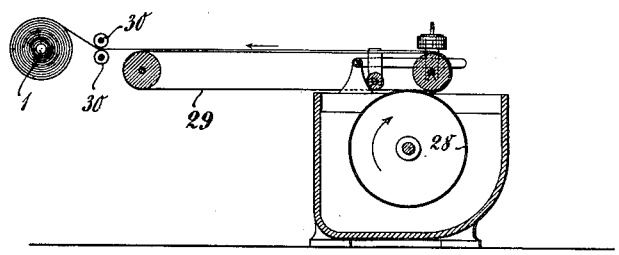
Fig. 8.
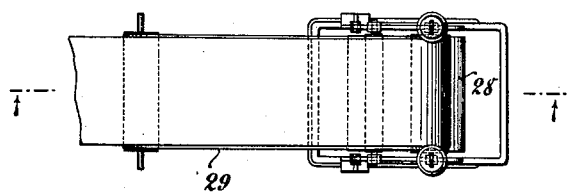
Fig. 9.
Fig. 7.

No. 868,193. PATENTED OCT. 15, 1907.
A. LEINVEBER.
PROCESS OF PREPARING FROM CELLULOSE, PAPER PULP, WOOD PULP, OR SIMILAR MATERIAL, STRIPS CAPABLE OF BEING SPUN.
APPLICATION FILED MAY 2, 1902.

5 SHEETS—SHEET 5.

Witnesses:
Arthur Sholz
Paul Wallenberg

Inventor:
Alfred Leinveber
by O. E. Duffy
Attorney

UNITED STATES PATENT OFFICE.

ALFRED LEINVEBER, OF HILBERSDORF, GERMANY.

PROCESS OF PREPARING FROM CELLULOSE, PAPER-PULP, WOOD-PULP, OR SIMILAR MATERIAL, STRIPS CAPABLE OF BEING SPUN.

No. 868,193.  Specification of Letters Patent.  Patented Oct. 15, 1907.

Application filed May 2, 1902. Serial No. 105,808.

*To all whom it may concern:*

Be it known that I, ALFRED LEINVEBER, a subject of the King of Prussia, and whose post-office address is No. 50$^D$ Roonstrasse, Hilbersdorf, near Chemnitz, Saxony, German Empire, have invented certain new and useful Improvements in or Relating to the Process of Preparing from Cellulose, Paper-Pulp, Wood-Pulp, or Similar Material Strips Capable of being Spun; and I do hereby declare that the following is a full, clear, and exact description of the invention, which will enable others skilled in the art to which it appertains to make and use the same.

The known methods, hitherto used for the process of preparing from cellulose, paper-pulp, wood-pulp and similar material threads or strips capable of being spun, do not allow, when paper machines are used of the formation of strips, of the full width of the machine's capacity nor of the full speed of the machine being utilized, and when a paper strip is used in the initial step for the formation of the thread, the band like form is not avoided and a perfectly round thread is not obtained. These drawbacks are overcome by the present invention the short fibers such as those of cellulose etc. floated up in liquids being united upon a paper machine to the full width of the latter so as to form the paper band: this paper band is then by dividing devices cut into strips which are moistened and condensed without being twisted.

The accompanying drawings illustrate diagrammatically a machine for carrying out the process.

Figure 1:
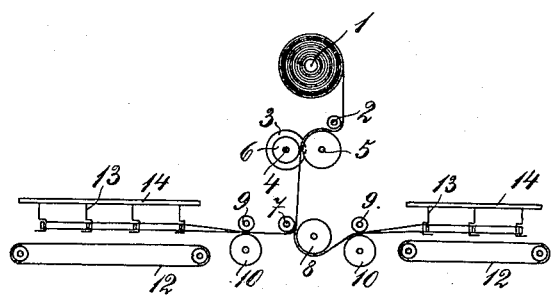
Figure 2:
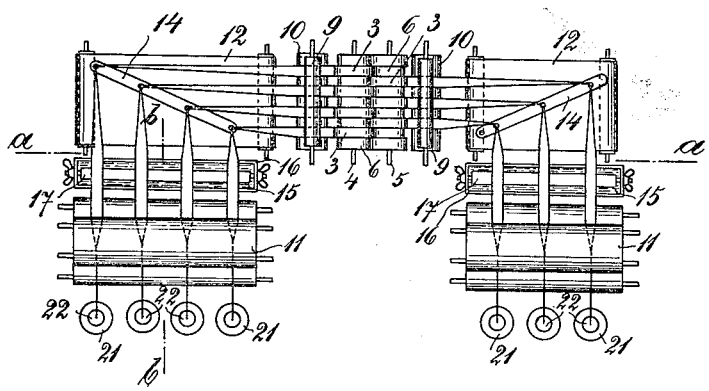
Figure 3:
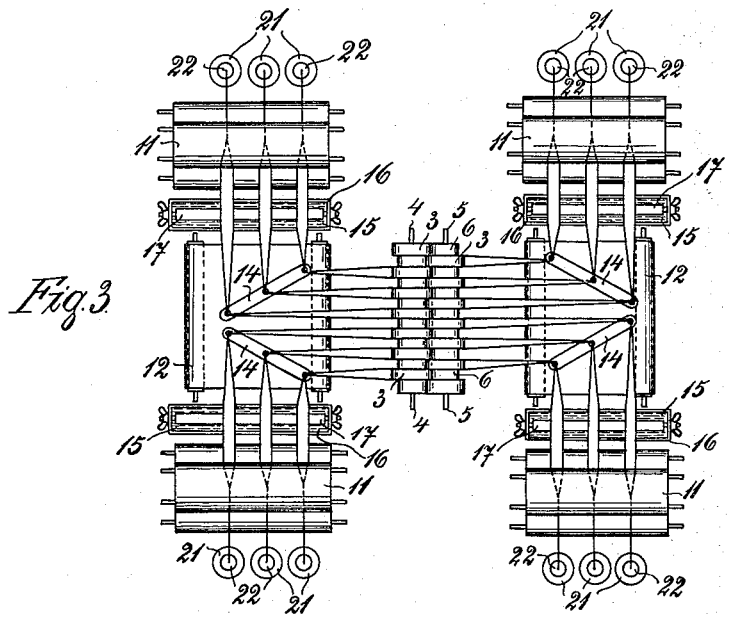
Figure 4:
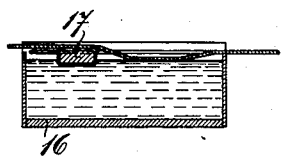
Figure 5:
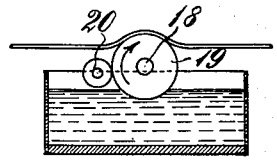
Figure 6:
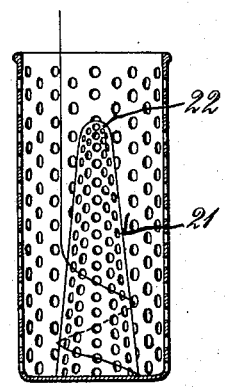
Figure 10:
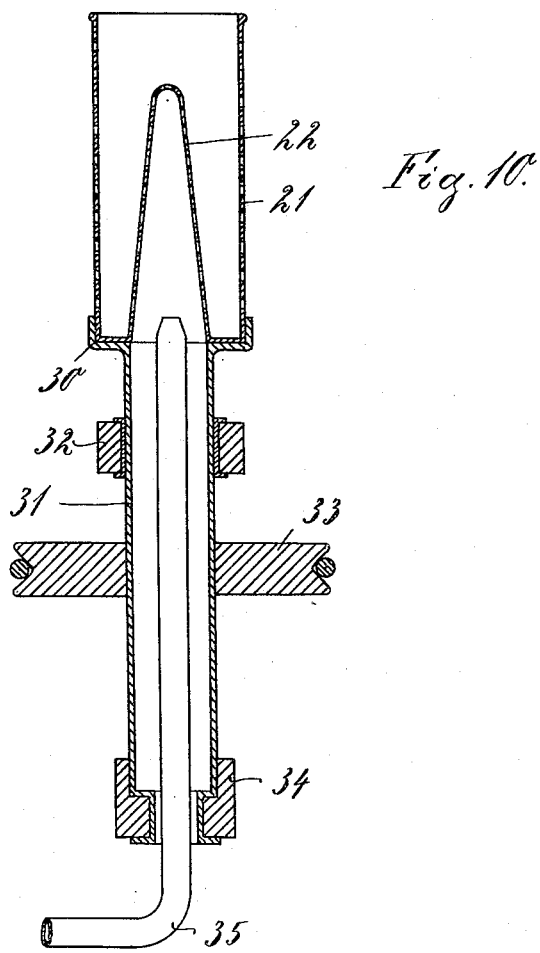

Figure 1 is a vertical section on the line *a—a* of Fig. 2. Fig. 1$^a$ shows in a diagrammatical manner a modification of the machine, Fig. 2$^a$ is a plan view of the modification according to Fig. 1$^a$. Fig. 1$^b$ is a fragmentary sectional side-view of condensing aprons, used in connection with my invention. Fig. 2$^b$ is a corresponding plan view. Fig. 2 is a top plan view of the machine. Fig. 3 shows a top plan view of a further modification of the machine, and Fig. 4 is a transverse sectional view of a preferred form of moistening device. Fig. 5 is a similar view of a modified form of moistening device. Fig. 6 is a sectional view of one of the pots for receiving the moistened strips. Fig. 7 is a detail sectional view taken on line 7 of Fig. 2. Figs. 8 and 9 are sectional and plan views respectively of a simple form of machine for producing the paper band. Fig. 10 is a fragmentary sectional side view illustrating the arrangement for rotating the spinning pots.

With the apparatus shown in Figs. 8 and 9, the short fibers, such as wood cellulose, which have been dissolved in a fluid, such as water, are united on a perforated drum 28 to form a continuous band of paper in the usual way, the paper band being thus produced of the full width of the drum, as shown in Fig. 9. The band is then taken from the drum 28 by an endless belt 29 and wound, after passing guide rolls 30, onto a roller 1. From this roller the paper is drawn off and led past a guide roller 2 to a dividing apparatus for being cut into strips. This dividing apparatus consists of a number of solid dividing or cutting disks 3, having a width corresponding to that required for the single strips for the formation of the ribbons. The cutting disks are fixed upon shafts 4 and 5, and between each two cutting disks is arranged a washer 6 of soft elastic material and of a width equal to the cutting disk but of a smaller diameter so that the cutting disks 3 secured to the shafts 4 and 5 engage with each other and cut the paper band, passing between them, into separate strips. The cutting disks bear during their rotation against the soft washers 6 so as to insure through the latter a drawing forward of the paper band or strips and a good working of the cutting rollers, the engagement of the cutting disks being adjustable according to the thickness of the paper band or the material to be cut.

It is necessary for the further treatment of the separate strips to so guide the latter, still close to each other, as to insure a sufficient space between the strips for the further treatment of the fibers for instance by the condensing aprons. To this end the strips on leaving the cutting disks are led, between the guiding rollers 9 and 10, either all in one direction as shown in the Figs. 1$^a$ and 2$^a$ or alternately over the rollers 7 and 8, half in a forward direction and half in a backward direction, in which latter case a space of the width of a strip is left between each two of the deviated bands. In order to still further increase this space between the strips, the latter are guided over a table 12 from which they are led through guide hooks, rollers or the like laterally and at a right or an oblique angle to the cutting plane unto the condensing aprons 11. As shown in Fig. 2 a rod 14 carrying guide hooks 13 is arranged above the table 12 in any convenient manner so that the strips passing through the hooks 13 are spaced further apart than before. As shown in Fig. 3 the strips can also be drawn off from both sides of the table 12 in order to reduce as much as possible the length of the condensing aprons 11. The width of the spaces between the strips can be adjusted according to the length of the table 12 by the position of the guide bar 14 as the distance between two strips after their deviation through the guide bar is the greater the more obtuse the angle which the latter forms with the strips.

The arrangement of the condensing apron 11 is clearly illustrated in Figs. 1$^b$ and 2$^b$. The condensing apron or belt 11 is carried by the rollers 11$^1$, mounted in the frame 11$^2$. The side walls 11$^3$ of the frame project upwards and are provided with pins 11$^5$ carrying rollers 11$^4$. These rollers are mounted in guiding bearings 11$^6$.

The upwardly extending arms 11⁷ of the frame 11² are provided with horizontally right-angled extremities 11⁸, to which eccentric rods 11⁹ are secured for the purpose of reciprocating the frame 11² and the condensing apron 11. The eccentric rods 11⁹ are driven in any suitable manner, not further shown in the drawings. Before being condensed the fibers of the strips must again be loosened in order to obtain a good round thread; for this purpose a moistening device 15 through which the strips are guided in order to be moistened is arranged between the table 12 and the condensing aprons 11.

As shown in Fig. 4, this moistening device consists of a receptacle 16 filled with liquid and provided with an adjustable guide rod 17 covered with soft liquid absorbing material and so arranged that the strip on passing over the rod is moistened by the liquid and after passing the rod lies upon the surface of the liquid whereby the loosening of the fibers is effected. The closer the rod 17 is placed to the point at which the strip enters the receptacle the longer the strips remain in contact with the liquid and consequently a more complete loosening of the fibers is effected.

A modified form of moistening device is shown in Fig. 5, in which several rollers 19 coated with soft material one for each strip, are arranged upon a shaft 18 journaled in the liquid container, each of the rollers being free to rotate and driven by a small roller 20. The strips to be moistened are guided over the rollers 19 and moistened by the liquid taken up by the rollers 19. According to the pressure with which the roller 20 rotating at a variable speed bears against the rollers 19 the liquid is squeezed off and held back from the latter whereby the loosening of the fibers in the strips can be conveniently controlled. The liquid container 16 can be filled with a colored liquid whereby the paper strips can be colored in a very easy manner. The moistened strips are then condensed into round threads by the condensing aprons 11 after which they are led into pots 21 resembling spinning pots and which are so constructed as to allow either the drying of the strips or to maintain any desired degree of moisture. The spinning pots 21, which for the purpose of a more convenient introduction of the strips are rotatable about their axis are formed of perforated or solid sheet metal and in their interior are provided with a hollow mandrel 22 (as shown in Fig. 6) which is open at the bottom and may be made of perforated sheet metal in order to readily and steadily maintain by means of hot air or steam introduced into the pot, the degree of moisture required for the roving strips preparatory to the spinning process. These spinning pots can of course be also used for dry or moist uncondensed strips as also generally for receiving spinning goods for spinning purposes. The spinning pot 21 provided with the hollow mandrel 22 is placed upon a support 30 fixed to a hollow shaft 31. The hollow shaft 31 is supported by a bolster 32 being divided, and is provided with a driving pulley 33 for rotating the shaft and the spinning pot. At its lower part the hollow shaft is reduced, permitting it to be carried by a step bearing 34. Within the hollow shaft a steam tube is arranged serving for introducing the steam into the hollow mandrel 22 and the spinning pot 21. The condensed strips stored up in the spinning pots may then be spun, say upon ring spinning machines. The strips or ribbons produced according to the new method may, when of particularly narrow width, be spun without being first condensed into a round thread, by using a suitable form of spinning machine.

What I claim and desire to secure by Letters Patent of the United States, is:—

1. A process of preparing from cellulose, paper pulp, wood pulp and similar material, threads capable of being spun, which process consists in floating the short fibers in liquid, uniting the fibers into a band upon a paper machine to the full width of the latter, dividing the paper band to form strips, and moistening and condensing said strips to form round threads without twisting them, substantially as described.

2. A process of preparing from cellulose, paper pulp, wood pulp and similar material, threads capable of being spun, which consists in floating the short fibers in liquid, uniting the fibers into a band upon a paper machine to the full width of the latter, dividing the paper band to form strips, leading the strips over tables and diverting them from this straight course at an angle to the cutting plane, and moistening and condensing the strips to form round threads without twisting them, substantially as described.

3. A process of preparing from cellulose, paper pulp, wood pulp and similar material, threads capable of being spun, which process consists in floating the short fibers in liquid, uniting the fibers into a band upon a paper machine to the full width of the latter, dividing the paper band to form strips, leading said strips into suitable receptacles, and subjecting the said strips to any desired degree of moisture while therein preparatory to spinning the same, substantially as described.

4. A process of preparing from cellulose, paper pulp, wood pulp and similar material, threads capable of being spun, which consists in floating the short fibers in liquid, uniting the fibers into a band upon a paper machine, dividing the paper band to form strips, and moistening and condensing said strips to form round threads without twisting them, substantially as described.

5. A process of preparing from cellulose, paper pulp, wood pulp and similar material, threads capable of being spun, which process consists in floating the short fibers in liquid, uniting the fibers into a band upon a paper machine, dividing the paper band to form strips, leading said strips into suitable receptacles, and subjecting the said strips to any desired degree of moisture while therein preparatory to spinning the same, substantially as described.

6. A process of preparing from cellulose, paper pulp, wood pulp and similar material, threads capable of being spun, which process consists in floating the short fibers in liquid, uniting the fibers into a band upon a paper machine, dividing the paper band to form strips, moistening and condensing said strips to form round threads without twisting them, leading said strips into suitable receptacles, and subjecting the said strips to any desired degree of moisture while therein preparatory to spinning the same, substantially as described.

In testimony whereof I have hereunto set my hand in presence of two subscribing witnesses.

ALFRED LEINVEBER.

Witnesses:
 MAX RIEDEL,
 H. THIELE.